June 4, 1957 R. F. LEVERENZ 2,794,756
REINFORCED PLASTIC ARTICLE
Filed Oct. 3, 1952

INVENTOR.
ROY F. LEVERENZ
BY
ATTORNEYS

United States Patent Office 2,794,756
Patented June 4, 1957

2,794,756

REINFORCED PLASTIC ARTICLE

Roy F. Leverenz, China Lake, Calif.

Application October 3, 1952, Serial No. 313,089

3 Claims. (Cl. 154—43)

(Granted under Title 35, U. S. Code (1952), sec. 266)

The invention described herein may be manufactured and used by or for the Government of the United States of America for governmental purposes without the payment of any royalties thereon or therefor.

This invention relates to novel reinforced plastic articles and the method of producing them.

In the past, reinforced plastic articles have been manufactured by laying up fiber glass mat or other reinforcing filler on a mold form, applying resin thereto and curing. This process requires the use of a parting agent or mold releasing material adjacent the mold form to provide for separation of the mold from the cured article. Upon removal of the article from the mold any additional reinforcing necessary is bonded onto the plastic article or fastened to it with standard fittings. According to another process a reinforced plastic "preform" is made by drawing glass fibers on a screen by a blower-produced partial vacuum followed by impregnation of the suspended reinforcement with resin. After quick curing the "preform," the screen is removed, additional reinforcement and resin is added and this addition is cured on the "preform" under pressure and heat between enclosing molds.

The method utilizing the mold has the disadvantage that extensive production requires a large number of molds, thus creating maintenance and storage problems. Another disadvantage of this method is the problem of separating the cured article from the mold at the end of the process. A further disadvantage is that the fact that after use the mold form must be smoothed and a new coating of a mold release agent applied. Further, this process may require additional reinforcing of the article or other internal structural members for support after it is removed from the mold. It is readily apparent, therefore, that this method with all of the separate steps is highly time consuming and, therefore, not well adapted for mass production.

A disadvantage attendant to the "preform" method is the fact that the lamination of the reinforcement plus resin to the "preform" is often quite difficult because of the limitations imposed in selecting compatible resins. A further disadvantage of this process is the fact that the number of separate steps required in its application creates a time element which is undesirable for mass production. A further disadvantage is the fact that expensive equipment is necessary for the production of a satisfactory preform.

It is, therefore, an object of this invention to provide a method for making a reinforced plastic article which is practical, requires a minimum number of steps, is economically feasible and provides an article of superior quality.

It is another object of this invention to provide a method, as stated above, which eliminates the use of removable molds.

It is a further object of this invention to provide a method as stated above in which a mold release agent is not required.

It is a still further object of this invention to provide a method as stated above which provides a completely reinforced article of great strength and durability which does not require additional reinforcement.

It is a further object to provide a method as stated above which permits versatility in shape and size of the article and permits construction of the article on the job without the use of extensive installations.

It is another object to provide a finished article in which the mold member becomes an integral shock and vibration-damping agent.

It is still another object to provide a finished article in which the mold member becomes an insulative agent against temperature change.

It has geen found that the above and other objects can be accomplished and the enumerated difficulties overcome by forming a core member of the desired shape, covering the core member with a barrier member which is impervious to resin, forming an outer layer of reinforced plastic over the barrier layer and curing the outer layer to form an integral article of core, barrier and reinforced plastic. According to a modification of this process a second and outer barrier member is placed over the reinforcing material and vacuum applied between it and the inner barrier to distribute resin throughout the reinforcing material, prevent the assimilation of air and compress the layer uniformly. After the resin has been properly distributed it is cured with the formation of an integral article. The outer barrier layer may then be removed if required.

Reference is made to the drawing, hereby made a part of this specification, in which.

Figure 1:
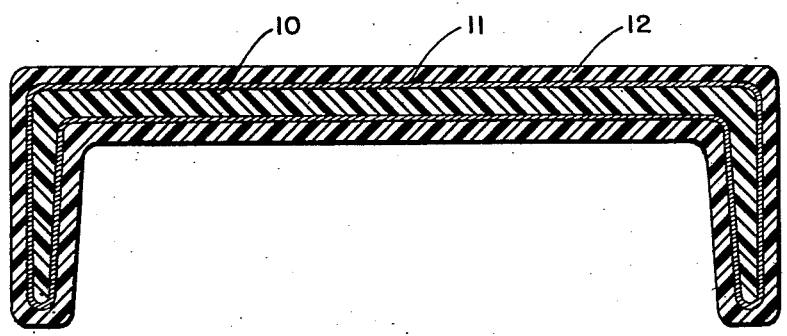
Fig. 1 is a vertical cross-section of an article made by the process of this invention.

Referring to Fig. 1, 10 is a core member which may be made of a single section or of a number of sections laminated or otherwise fastened together. This core member may be made of plastic, metallized plastic, metal or other material. The plastic may be in the form of foamed plastic or honeycomb plastic. The preferred plastic is foamed polystyrene. A barrier member, 11, separating the core member from the outer structure is secured over the core member as shown by use of an adhesive, or simply by brushing or spraying if the barrier material is a liquid before setting. Barrier layer 11 is essential to prevent the resin of the outer layer from permeating the inner mold member where the latter is formed of certain inexpensive foamed plastics or of open-celled plastics. The most economical foamed plastics which are contemplated for use in the present invention are not compatible with resin, the latter causing disintergration of the cellular structure of such plastics, and the cells of the open-celled plastics would become filled with resin. Thus, the mold member would become saturated with resin if the barrier layer were absent, and upon curing, the mold member would become hard and dense with a resultant undesirable increase in the weight of the finished article and the destruction of the vibration damping and heat insulating properties of the mold member. Reinforcement material, such as fiber glass, sisal, glass cloth, asbestos, cellulose or other material is then uniformly distributed over the barrier layer to form an outer layer of the desired thickness. Inorganic fillers may also be used with the resin. The reinforcing material is then impregnated with resin and pressed in order to remove air and secure a firm layer, 12. The built up structure is then permitted to cure at ambient temperature and pressure, or it may be cured in an oven or press at higher temperatures and pressures.

The barrier, 11, may be a sheeting material which has very low permeability to air and resin, or a liquid which upon drying forms a coating having low permeability to air or resin. The sheeting may be a material such as "pliofilm" (a rubber hydrochloride) or other resin impervious material put on with adhesive or by wrapping. The resin in the outer shell may be polyester resin, phenolic resin, melamine resin or other resins. The reinforcing material may be put on by laying up the fibers, blowing on, or by dipping mats of reinforcing material in resin and wringing out to remove excess resin and applying. The resin for the outer shell may be brushed, poured or sprayed on and rubbed or rolled to distribute it uniformly among the fibers and remove air and excess resin. Each reinforced layer may be built up of individual layers.

Figure 2:
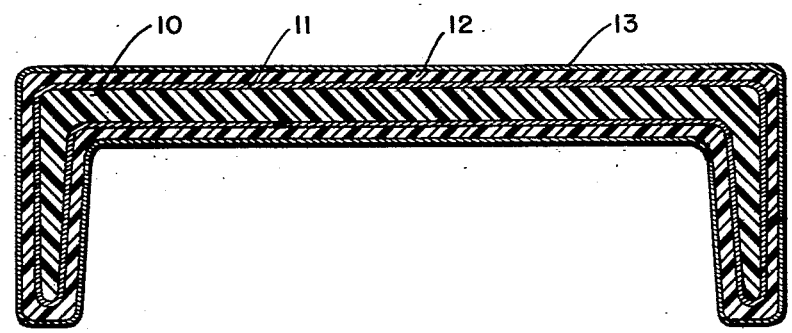
Fig. 2 is a vertical cross-section of an article made by a modification of the process of the invention.
Figure 3:
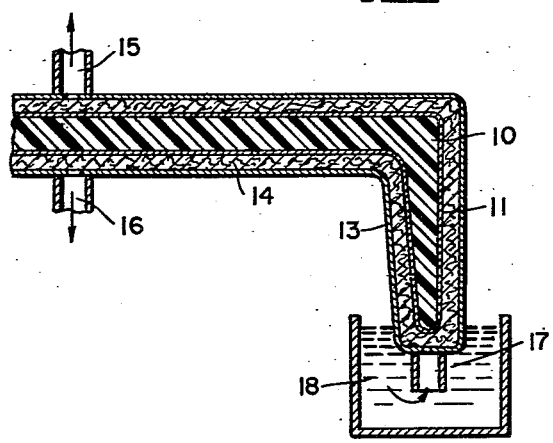
Fig. 3 illustrates the instant vacuum method of impregnating the layer of reinforcing material with resin and conforming the resin impregnated reinforcing layer to the inner mold member.

Referring to Figs. 2 and 3 an additional step may be included in the process, this step comprising the use of an outer barrier, 13, of the same material as the inner barrier, covering the layer of reinforced plastic. As shown in Fig. 3, the outer barrier layer 13 may be applied over the layer of reinforcing fibers 14 and may be provided with upper and low extensions 15 and 16, having passages communicating with space between barrier layers 11 and 13, and at least one lower opening 17 also communicating with such space. Extensions 15 and 16 are adapted to be connected to a vacuum producing mechanism (not shown) and opening 17 may be submerged in a container of resin 18. The vacuum created between the two barriers 11 and 13 will permit atmospheric pressure to force resin from container 18 into the space between said barrier layers. Atmospheric pressure acting on the external flexible barrier 13 will act to uniformly force and distribute the resin throughout the reinforcing fibers and conform the barrier layers and layer of reinforcing material to the inner mold member. In this modified process, the resin and air impervious inner barrier 11 will prevent the flow of resin into the mold member 10 which is especially important where the mold member is formed of a material which is not compatible with the resin, such as the inexpensive foamed plastics, or which would tend to have its cells filled with the resin, such as a material having an open-celled structure. Thus, if it were not for the inner barrier layer in such cases, the mold member would become saturated with resin with a reultant undesirable increase in the weight of the finished article, and moreover, the inner mold member then would not function satisfactorily as a vibration damping and heat insulating agent. Upon curing, the hardened reinforced plastic layer 12 of Fig. 2 will be formed. This process is distinguished from prior art methods of vacuum filling a reinforcing material with resin. A prior method provides for vacuum filling between a solid, rigid, male and a solid, rigid, female mold—non-flexible surfaces—while the presently described method provides for vacuum filling between flexible, non-rigid surfaces—the inner surfaces of which cover the core member and the outer surface of which provides for the use of the pressure of the atmosphere to be used directly as the female mold. In lieu of vacuum filling of the spaces between the barrier layers with resin, resin impregnated mats of reinforcing material may be applied over the inner barrier layer 11. The outer flexible barrier layer 13, having only the apertured extensions 15 and 16, can then be applied over the layer of resin impregnated reinforcing material. Upon the forming of a vacuum between the barrier layers, atmospheric pressure will act to uniformly force and distribute the resin throughout the reinforcing fibers and also conform the reinforcing material to the inner mold member.

If a smooth finish is required for the article being manufactured the curing step is carried out with the entire assembly between enclosing molds with the application of pressure.

The article made by the process of this invention serves many useful purposes. It can be used for navigation marker buoys, net floatation buoys, life-buoys, life rafts, shipping containers, storage boxes, surf boards, boats and numerous other articles. The advantage of the construction is that the shell has great strength, durability and can be easily prepared. Further advantages are the fact that the core, barrier and reinforcing material become an integral article without necessity of removing the core which functions as a mold member in the process. The core thereby becomes a reinforcing member, serves as a standby mold on which any repairs to the original article can be made, a filler to resist or prevent the admission of any foreign material, and, if a material of lower density than water, a displacement medium to supply buoyancy. The core member also serves as an integral shock and vibration damping agent for applications involving delicate mechanisms. It also serves as an effective insulative agent against temperature changes. Additional advantages are the fact that the use of removable molds is eliminated, thereby eliminating the problem of removing the mold after curing and obviating such problems as storage and handling of the mold. Further, no internal strengthening members are needed for the finished article. Versatility in structural shapes can be obtained by utilizing the assembly of sectional parts of a core member to form the desired shape. "On-the-job" molding can be accomplished by shipping the core members in sections, assembling them on the job and performing the reinforced plastic molding and curing operations on the spot.

A further advantage is that a minimum of steps are required, thus making the process attractive for mass production. The process eliminates inconveniences such as the use of a mold separating agent, maintenance and storage of mold forms. Because of the low density of the core member and the high density of the shell, only one consideration need be given the requirements of each (core and shell) plastic as regards the coefficient of expansion of each: that is, the coefficient of expansion of the core member shall always be equal to or less than the coefficient of the shell. Thus, it is not necessary that the coefficients be the same or very nearly the same, in contrast to prior art processes.

Obviously many modifications and variations of the present invention are possible in the light of the above teachings. It is, therefore, to be understood that within the scope of the appended claims the invention may be practiced otherwise than as specifically described.

What is claimed is:

1. A composite, reinforced plastic article comprising a preformed porous, lightweight core of foamed polystyrene, an outer layer of polyester resin reinforced with fiber glass, and between said outer layer and said core and securely attached to both, a barrier layer of rubber hydrochloride.

2. A composite reinforced plastic article comprising a preformed internal, lightweight, porous core of foamed polystyrene; a barrier layer of rubber hydrochloride completely enveloping said internal core; and an outer reinforcing layer of polyester resin completely enveloping said barrier layer with fiber glass uniformly distributed in said outer layer as a reinforcing material.

3. A composite reinforced plastic article comprising a preformed internal, lightweight, porous core of foamed polystyrene; a barrier layer of rubber hydrochloride completely enveloping said internal core; a reinforcing layer of polyester resin completely enveloping said barrier layer with fiber glass reinforcing material uniformly distributed in said outer reinforcing layer, and an outer barrier layer of rubber hydrochloride completely enveloping said reinforcing layer, said outer barrier layer being an integral, continuous, unbroken layer whereby a completely air-tight and water-tight seal is formed.

(References on following page)

References Cited in the file of this patent

UNITED STATES PATENTS

| | | |
|---|---|---|
| 1,020,005 | Witthoefft | Mar. 12, 1912 |
| 1,370,666 | Novotny | Mar. 8, 1921 |
| 1,979,691 | Jackson | Nov. 6, 1934 |
| 2,122,372 | Hopper et al. | June 28, 1938 |
| 2,200,634 | O'Koomian | May 14, 1940 |
| 2,214,824 | Smith et al. | Sept. 17, 1940 |
| 2,227,212 | Beck | Dec. 31, 1940 |
| 2,411,497 | Barnes | Nov. 26, 1946 |
| 2,429,121 | Crowley | Oct. 14, 1947 |
| 2,434,527 | Untiedt | Jan. 13, 1948 |
| 2,439,562 | Cunningham | Apr. 13, 1948 |
| 2,441,961 | Gessler et al. | May 25, 1948 |
| 2,477,852 | Bacon | Aug. 2, 1949 |
| 2,484,141 | Alex | Oct. 11, 1949 |
| 2,495,640 | Muskat | Jan. 24, 1950 |
| 2,596,184 | Sutton | May 13, 1952 |
| 2,605,514 | Eshenaur et al. | Aug. 5, 1952 |
| 2,613,397 | Borkland | Oct. 14, 1952 |
| 2,614,059 | Cooper | Oct. 14, 1952 |
| 2,620,484 | Gerry | Dec. 9, 1952 |
| 2,655,459 | Gordon et al. | Oct. 13, 1953 |

FOREIGN PATENTS

| | | |
|---|---|---|
| 415,728 | Great Britain | Sept. 3, 1934 |

OTHER REFERENCES

McMillan et al.: abstract of application Serial Number 638,894, published July 26, 1949.